US012585462B2

(12) United States Patent
Savchenko et al.

(10) Patent No.: US 12,585,462 B2
(45) Date of Patent: Mar. 24, 2026

(54) INFRASTRUCTURE PROVISIONING LOCAL AGENTS AND STORAGE

(71) Applicant: Scalr, Inc., San Francisco, CA (US)

(72) Inventors: Igor Savchenko, Walnut Creek, CA (US); Sebastian Stadil, Seattle, WA (US)

(73) Assignee: Scalr, Inc., San Francisco, CA (US)

( * ) Notice: Subject to any disclaimer, the term of this patent is extended or adjusted under 35 U.S.C. 154(b) by 0 days.

(21) Appl. No.: 18/197,757

(22) Filed: May 16, 2023

(65) Prior Publication Data

US 2023/0376308 A1      Nov. 23, 2023

Related U.S. Application Data

(60) Provisional application No. 63/344,276, filed on May 20, 2022.

(51) Int. Cl.
*G06F 8/71*          (2018.01)
*H04L 12/46*         (2006.01)
(52) U.S. Cl.
CPC ............ *G06F 8/71* (2013.01); *H04L 12/4633* (2013.01)
(58) Field of Classification Search
CPC ....................................................... G06F 8/71
See application file for complete search history.

(56) References Cited

U.S. PATENT DOCUMENTS 6,412,009 B1    6/2002   Erickson et al.
7,117,267 B2   10/2006   Bavadekar
7,441,036 B2   10/2008   Bomer et al.
8,010,497 B2    8/2011   Verma et al.
(Continued)

FOREIGN PATENT DOCUMENTS

CA          2951939 C  *  4/2023  ............. H04L 41/00
WO   WO-2013028636 A1  *  2/2013  ............. H04L 47/70

OTHER PUBLICATIONS

Serrano, Joao P at al., "Improvement of IT Infrastructure Management by Using Configuration Management and Maturity Models: A Systematic Literature Review and a Critical Analysis", Organizacija, vol. 53, 2020, 17 pages.

*Primary Examiner* — Francisco J Aponte
(74) *Attorney, Agent, or Firm* — Christensen, Fonder, Dardi & Busse PLLC

(57)                ABSTRACT

Methods and systems for version-control based provisioning and utilizing local agents in an information technology (IT) infrastructure system are disclosed. In embodiments a backend IT infrastructure system and a local system are provided and networked together. In embodiments the local provisioning system includes one or more of a local database, a local provisioning agent, and a version-control system. In embodiments, the backend IT infrastructure system is configured to receive a request to execute a run based on a configuration file including infrastructure as code instructions. In embodiments, the backend system is configured to submit one or more run tasks to the local provisioning agent. In embodiments the backend system is configured to output state files to the local database. In embodiments the version-control system is configured to manage the configuration file while the backend system is configured to monitor the file via the version-control system over a network tunnel.

6 Claims, 8 Drawing Sheets

(56) References Cited

U.S. PATENT DOCUMENTS

| | | | | |
|---|---|---|---|---|
| 8,429,630 | B2 * | 4/2013 | Nickolov | H04L 67/10 717/148 |
| 8,699,499 | B2 * | 4/2014 | Mulligan | H04L 41/40 370/395.54 |
| 8,782,637 | B2 * | 7/2014 | Khalid | G06F 8/61 718/1 |
| 9,003,411 | B2 * | 4/2015 | Wilson | G06F 9/4401 718/1 |
| 9,009,858 | B2 * | 4/2015 | Sapp, II | H04L 63/10 726/4 |
| 9,442,718 | B1 | 9/2016 | Wang et al. | |
| 9,594,605 | B2 | 3/2017 | Farrugia et al. | |
| 9,985,827 | B2 * | 5/2018 | Li | H04L 41/40 |
| 10,057,184 | B1 | 8/2018 | Prahlad et al. | |
| 10,146,809 | B2 | 12/2018 | Goeser | |
| 10,171,292 | B1 * | 1/2019 | Dolan | H04L 41/0803 |
| 10,176,005 | B2 * | 1/2019 | Silva | G06F 9/45558 |
| 10,318,285 | B1 | 6/2019 | Jodoin et al. | |
| 10,860,342 | B2 * | 12/2020 | Kolesnikov | G06F 9/45558 |
| 10,942,960 | B2 * | 3/2021 | Oliner | G06F 16/334 |
| 10,970,125 | B2 * | 4/2021 | Suresh | H04L 63/10 |
| 10,970,386 | B2 * | 4/2021 | Cho | G06F 21/53 |
| 10,999,162 | B1 | 5/2021 | Welch et al. | |
| 11,150,895 | B1 * | 10/2021 | Wall | G06F 8/65 |
| 11,212,191 | B2 * | 12/2021 | Vihervuori | H04L 41/24 |
| 11,223,526 | B1 | 1/2022 | Lang et al. | |
| 11,372,626 | B2 * | 6/2022 | White, III | G06F 8/60 |
| 11,385,925 | B1 * | 7/2022 | Mitra | H04L 41/16 |
| 11,522,812 | B1 * | 12/2022 | Thoppai | G06F 16/901 |
| 11,558,313 | B2 * | 1/2023 | Caceres | H04L 61/4511 |
| 11,853,100 | B2 * | 12/2023 | Sharma | H04L 63/062 |
| 11,947,574 | B2 * | 4/2024 | Day, Jr. | G06F 9/451 |
| 12,045,201 | B1 * | 7/2024 | Satish | G06F 16/283 |
| 2005/0108719 | A1 | 5/2005 | Need et al. | |
| 2013/0074064 | A1 * | 3/2013 | Das | G06F 9/5077 718/1 |
| 2014/0047079 | A1 * | 2/2014 | Breternitz | G06F 9/5072 709/220 |
| 2015/0026673 | A1 | 1/2015 | Shetty | |
| 2015/0040025 | A1 * | 2/2015 | Deklich | G06F 9/5072 715/744 |
| 2015/0378700 | A1 | 12/2015 | Rachamadugu et al. | |
| 2017/0034075 | A1 | 2/2017 | Burk et al. | |
| 2017/0063614 | A1 * | 3/2017 | Hartwig | H04L 41/0883 |
| 2018/0241824 | A1 * | 8/2018 | He | H04L 67/10 |
| 2018/0284975 | A1 | 10/2018 | Carrier et al. | |
| 2019/0020540 | A1 * | 1/2019 | Yen | H04L 67/34 |
| 2019/0141079 | A1 | 5/2019 | Vidas et al. | |
| 2019/0188185 | A1 * | 6/2019 | Lichtenberg | G06F 3/04842 |
| 2019/0296982 | A1 * | 9/2019 | Clark | H04W 24/02 |
| 2019/0324743 | A1 | 10/2019 | Sjadi | |
| 2020/0106711 | A1 * | 4/2020 | Sok | G06F 8/61 |
| 2020/0183707 | A1 | 6/2020 | Hashimoto et al. | |
| 2020/0183739 | A1 | 6/2020 | Hashimoto et al. | |
| 2020/0183754 | A1 | 6/2020 | Hashimoto et al. | |
| 2020/0387357 | A1 * | 12/2020 | Mathon | G06F 9/4411 |
| 2021/0035116 | A1 * | 2/2021 | Berrington | G06N 5/04 |
| 2021/0105275 | A1 * | 4/2021 | Bansal | H04L 63/0281 |
| 2021/0119874 | A1 | 4/2021 | Ryman et al. | |
| 2021/0328864 | A1 | 10/2021 | Hashimoto et al. | |
| 2021/0359920 | A1 | 11/2021 | Welch et al. | |
| 2022/0014427 | A1 | 1/2022 | Lang et al. | |
| 2022/0078228 | A1 | 3/2022 | Stitt et al. | |
| 2022/0086055 | A1 * | 3/2022 | Aftab | H04L 41/145 |
| 2022/0300340 | A1 * | 9/2022 | Cardenas | G06F 9/505 |
| 2022/0353295 | A1 * | 11/2022 | Yeh | H04L 63/029 |
| 2022/0353341 | A1 * | 11/2022 | Östrand | H04L 67/51 |
| 2023/0133380 | A1 * | 5/2023 | Kreger-Stickles | H04L 67/10 709/220 |
| 2023/0161945 | A1 | 5/2023 | Vadapandeshwara et al. | |
| 2023/0274230 | A1 | 8/2023 | Savchenko et al. | |
| 2023/0315512 | A1 | 10/2023 | Savchenko et al. | |
| 2023/0342210 | A1 | 10/2023 | Savchenko et al. | |
| 2025/0097227 | A1 * | 3/2025 | Grzonkowski | H04L 63/1433 |

* cited by examiner

INFRASTRUCTURE PROVISIONING LOCAL AGENTS AND STORAGE

RELATED APPLICATIONS

The present application claims the benefit of U.S. Provisional Patent Application No. 63/344,276 filed May 20, 2022, the disclosure of which is incorporated by reference herein in its entirety.

TECHNICAL FIELD

The present disclosure relates to information technology systems and, more specifically, to networked local and backend systems, the local systems including local data storage and local agents for infrastructure provisioning.

BACKGROUND

Information technology (IT) infrastructure refers generally to the resources and services required for the establishment and operation of an IT environment. IT environments in turn, are then used by an enterprise or other organization to provide IT services to its employees and customers. Resources include hardware, software, and network resources, and can be provided remotely. For example, resources can be provided as Software-as-a-Service (SaaS), Platform-as-a-Service (PaaS), Infrastructure-as-a-Service (IaaS), web application, and the like.

Hardware resources are used to host software resources and include servers, computers, storage, routers, switches, and the like. Software resources include applications that are used by the enterprise or other organization for internal purposes or customer-facing purposes. For example, software resources can include enterprise resource planning (ERP) software applications, customer relationship management (CRM) software applications, productivity software applications, and the like. Network resources include the resources used to provide network connectivity, security, and the like. Remote access to software and hardware resources may be enabled and regulated by the network resources.

Within the IT environment, users can establish one or more workspaces to be available as a configuration of resources within the IT infrastructure. The one or more workspaces each include a configuration file that describes the rules for use of IT infrastructure, and values serving as inputs for the configuration file. The one or more workspaces also reference a state file describing the state of the IT infrastructure. Users can assign various projects to the one or more workspaces where there may be many people working on the same project, such as using a cloud-computing application, or where users work independently on different portions of the project Improvements to the field of IT infrastructure systems for the establishment and operation of IT environments would be welcome

SUMMARY

Embodiments of the disclosure are directed to methods and systems for version-control based provisioning and utilizing local agents in an information technology (IT) infrastructure system. In one or more embodiments a backend IT infrastructure system and a local system are provided and networked together. In various embodiments the local provisioning system can includes one or more of a client device, a local database, a local provisioning agent, and a version-control system configured to manage changes to a configuration file describing a configuration of API-manageable resources. In various embodiments, the backend IT infrastructure system is configured to receive a request to execute a run based on the configuration file. In one or more embodiments, the backend system is configured to submit one or more run tasks resulting from a run request to the local provisioning agent in lieu of or in addition to an IT infrastructure controller at the backend system.

In various embodiments the backend system is configured to output state files resulting from executing run tasks to the local database in addition to or in lieu of a state file database at the backend system. In embodiments the version-control system is configured to manage the configuration file while the backend system is configured to monitor the file via the version-control system over a network tunnel. In various embodiments the backend system is configured to execute a run-in response to detected changes in the configuration file such that the backend system is configured to automatically update provisioned resources based on the most recent version of the configuration file.

Such embodiments provide improved redundancy, system resilience, and can assist users with data compliance issues. For example, in various embodiments the local system may be located within a first jurisdiction, such as the United States or the European Union, which may possess compliance regulations for the storage of particular types of data. For example, the first jurisdiction may require the storage of data within its own jurisdiction or alternatively may forbid storage of data within certain jurisdictions, such as jurisdictions that are hostile to the first jurisdiction or where storage in said jurisdiction may result in security concerns. As such, particular embodiments may be beneficial for compliance with certain security regulations such as SOC 2, or other compliance standards. Further, various embodiments provide improved redundancy by storing state files in database that is under the control of a user such that if the backend system experiences down time, or is otherwise unavailable over the network, the owner of the local system will still have access to state files. As such, the owner of the local system will be able to determine the current state of the IT infrastructure, the history of changes, and the like, without requiring constant access to the backend system.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
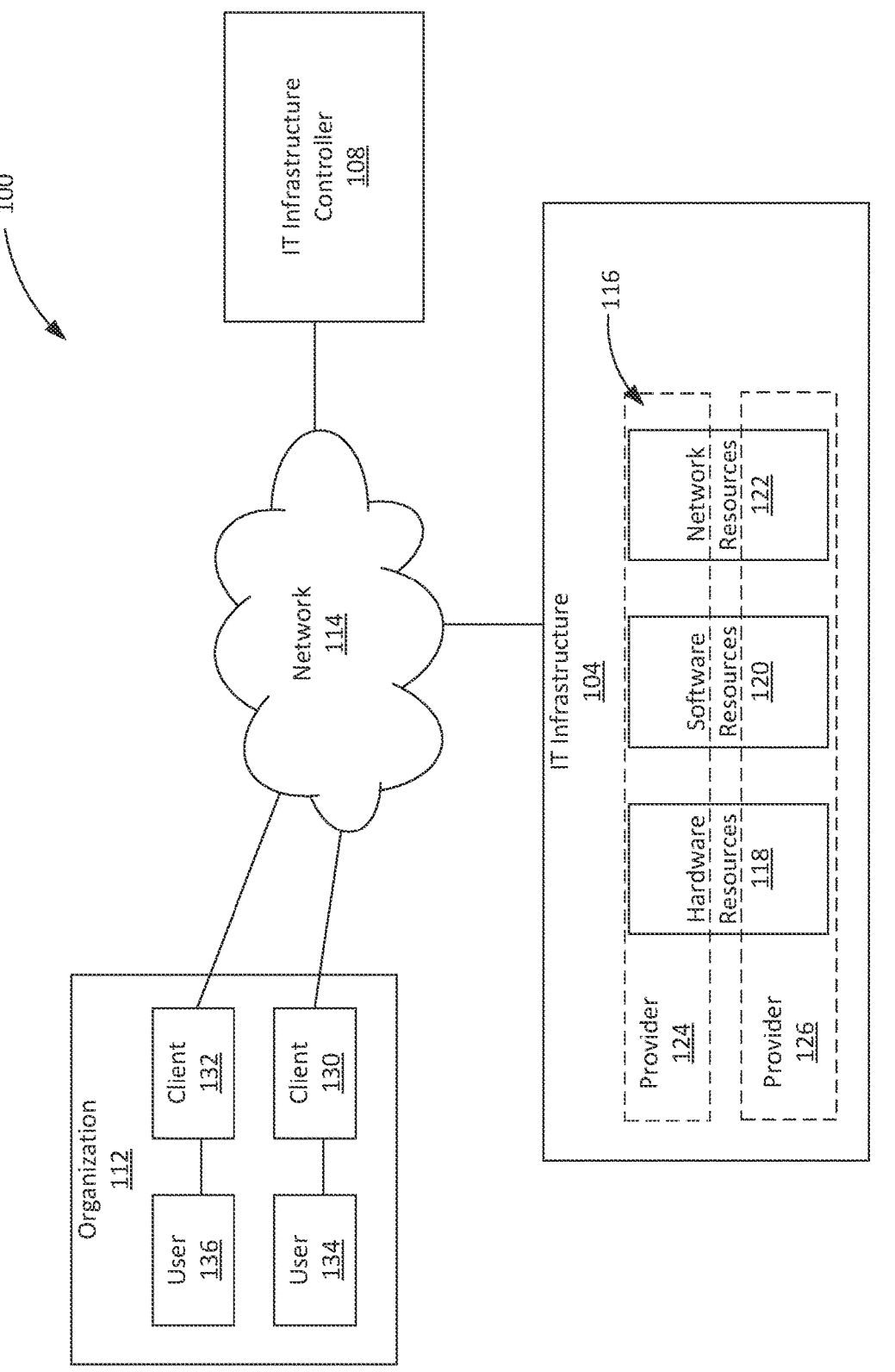
FIG. 1 depicts a system diagram of an information technology (IT) system, according to one or more embodiments of the disclosure.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Referring to FIG. 1, an information technology (IT) system 100 is depicted. In various embodiments, the system 100 includes an IT infrastructure 104, an IT infrastructure controller 108, and an organization 112. In one or more embodiments, the IT infrastructure 104, IT infrastructure controller 108, and the organization 112 are communicatively coupled via a network 114 which includes any wired or wireless network including, for example, a local area network (LAN), a wide area network (WAN), a public land mobile network (PLMN), the Internet, and the like.

In one or more embodiments the IT infrastructure 104 refers generally to a collection of one or more resources 116. Resources 116 can include hardware, software, and/or network components, and can be provided remotely. For example, resources 116 can include server hardware, virtual machines or instances, software applications, and the like. In various embodiments, resources 116 are defined or organized into one or more "blocks" that are managed by the system 100 for provisioning or de-provisioning components of the infrastructure 104. For example, depicted in FIG. 1, the infrastructure 104 is organized into a plurality of resource blocks that include a hardware resource 118, a software resource 120, and a network resource 122.

In one or more embodiments, the resources 116 are sourced from or otherwise provided by one or more providers 124, 126. In such embodiments, providers 124, 126 are entities, such as an individual, group, company, organization, or the like, that possess control over access to the resources 116. For example, the providers 124, 126 could be third party providers that provide access to resources as an infrastructure-as-a-service (IaaS), a platform-as-a-service (PaaS), a software-as-a-service (SaaS), or the like. In certain embodiments, the provider(s) 124, 126 can include the organization 112, such as where the organization owns or otherwise controls access to the resources themselves.

In one or more embodiments the blocks can include various information such as arguments, parameters, variables, tags, strings and the like which can be used to configure the resource. For example, the block could include strings indicating the resource type, the resource name, and the provider 124, 126. Further, while the resource blocks depicted in FIG. 1 as being defined by the type of resource (e.g., hardware, software, network), in certain embodiments the blocks could be organized according to a different manner. For example, the block could be organized based on the provider and/or could include including multiple types of resources in a single block.

In one or more embodiments, the IT infrastructure controller 108 is a logical device configured for programmatic control of access to resources 116 via a resource management API or other kind of software. In such embodiments, the controller 108 can create, check, modify, or delete the access to resources 116 for the organization 112 or other entity in the system 100.

For example, in various embodiments, the controller 108 is configured to receive infrastructure as code (IaC) instructions that describes a "configuration" of infrastructure. In one or more embodiments, based on the IaC instructions the controller 108 generates a plan that describes what the controller 108 will do to reach the desired state of infrastructure indicated by the configuration. In one or more embodiments the controller 108 can then execute or "apply" the plan to build the described infrastructure. Although in certain embodiments, the execution or application of the generated plan is optional and the controller 108 may simply generate the plan without an apply.

In various embodiments, the IaC instructions can be included within a configuration file. In such embodiments, the configuration file can represent a potential configuration of infrastructure that can be put into effect by the controller 108. For example, in one or more embodiments the configuration file includes resource definitions, environment variables, input variables, and/or other information described using an IaC language. A configuration file can be obtained by a user of a client computer and provided to the controller 108 to provision or de-provision infrastructure resources to match the state of infrastructure described by IaC instructions in the file. In various embodiments, configuration files describe the components needed to run an application, process, or the like. For example, in one or more embodiments the configuration file can be used by the user to provision resources in order to support the deployment, testing, and/or maintenance of a software application, and/or to ensure that the performance of the hosted software satisfies a threshold performance metric, such as a service level objective. In various embodiments, the configuration file can be obtained by a user from a database or registry of existing configuration files or can created by the user or by the organization 112.

In one or more embodiments, the organization 112 is a unit for and grouping clients, users, and the like, together and for controlling the group's access to resources 116. In various embodiments, the organization 112 can represent an enterprise or a sub-group within the enterprise, such as a business unit within the company. As shown in FIG. 1, the organization 112 can include one or more clients 130, 132, along with one or more associated users 134, 136 that interact with the system 100. Further, it should be appreciated that while FIG. 1 depicts a single organization 112, additional organizations, clients, and users may be included in the system 100.

Figure 2A:
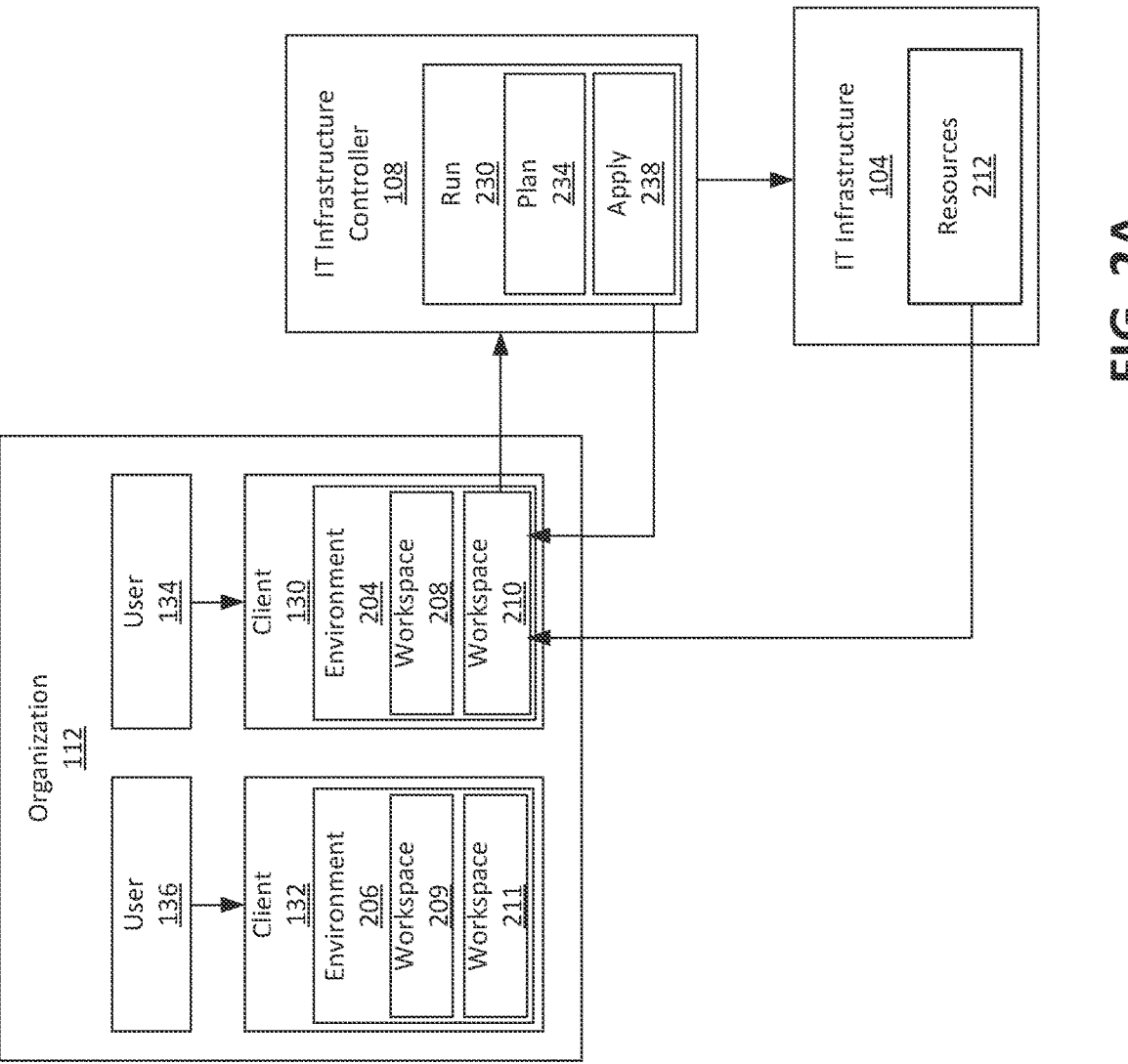
FIGS. 2A-B depict block diagrams of an IT system including IT environments and one or more workspaces, according to one or more embodiments of the disclosure.
Figure 2B:
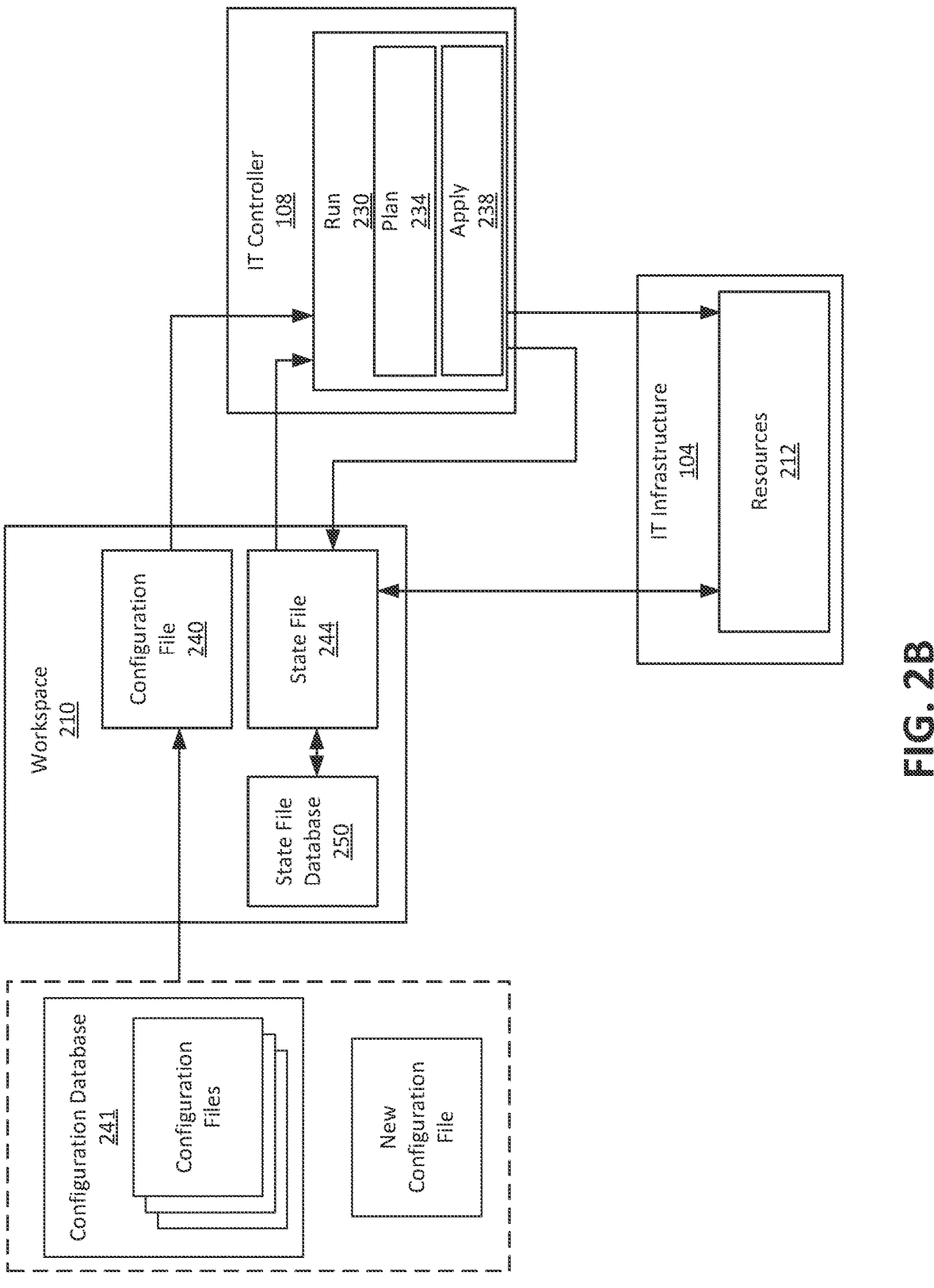

Referring to FIGS. 2A-2B, a block diagram of the organization 112 and IT environments 204, 206 is depicted and a block diagram of a workspace 210 is depicted, according to one or more embodiments. In various embodiments, the environment 200 includes an organization 112 grouping together one or more clients 130, 132 each associated with one or more users 134, 136. In various embodiments the clients 130, 132 each include an IT environment 204 which includes one or more workspaces 208, 209, 210, 211.

In one or more embodiments, a workspace is a unit for grouping a configuration of resources 212 that is planned to be provisioned or has been provisioned by the controller 108. In such embodiments, the planned or provisioned configuration of resources occurs within a workspace, and Each workspace contains everything necessary to manage a given collection of infrastructure. For instance, referring additionally to FIG. 2B, in various embodiments the workspace 210 contains configuration information including a configuration file 240 and one or more state files 244. For clarity and simplicity, the configuration information, including configuration files and state files associated with workspaces 208, 209, and 211 are omitted from FIGS. 2A-B. As described above, the configuration file 240 is a file including IaC instructions representing a potential configuration of infrastructure that can be put into effect by the controller 108. For example, in one or more embodiments the configuration file includes resource definitions, environment variables, input variables, and/or other information described using an IaC language. A configuration file can be obtained by a user of a client computer and provided to the controller 108 to provision or de-provision infrastructure resources to match the state of infrastructure described by IaC instructions in the file. In various embodiments the configuration file 240 can be obtained, inputted, or initialized from a configuration database 241 of existing configuration files or can created as a new file by the user or by the organization 112.

In various embodiments, the state files 244 serve as a "source of truth" for the workspace by including information that indicates a current state of infrastructure 104 including the resources 212 corresponding to each workspace. For example, in various embodiments the system stores the IDs and properties of the resources it manages for the workspace in the state file 244, so that it can update or destroy those resources 212 going forward. As such, the state file functions as a reference point for making changes to infrastructure 104 to match a configuration described in the configuration file 240.

In or more embodiments, this configuration information is maintained by the system and then is used whenever it executes an operation in the context of that workspace. For example, to further modify the infrastructure to provision or deprovision resources in that workspace. As such, in various embodiments the workspace will produce specific runs, including plans and/or applies, that are specific to each workspace. In one or more embodiments, each workspace retains backups or a database of configuration information. For example, in various embodiments the workspace includes a state file database 250 including some or all previous state files associated with the workspace. For example, the state file database 250 can be useful for tracking changes to the workspace over time or recovering from problems. In certain embodiments, the workspace includes a run history database that includes a record of all run activity, including one or more of summaries, logs, a reference to the changes that caused the run, and user comments.

In one or more embodiments the IT infrastructure controller 108 is configured to perform one or more operations to provision, modify, and/or de-provision resources 212 at the infrastructure 104 in order to apply the configuration file 240 associated with the workspace 210. In various embodiments, this process is referred to as a "Run". Performing a run to provision infrastructure is expected such as when new configurations are added to the workspace 210 or when existing configurations need to be modified. In various embodiments, the IT infrastructure controller 108 is configured to first plan the runs, thereby creating proposed changes to the infrastructure 104. In some embodiments, the plan of proposed changes is then executed by the controller 108 to actually modify the infrastructure 104.

Depicted in FIGS. 2A-2B, and described further below, a run 230 is depicted stored in the memory of the IT infrastructure controller 108. In various embodiments the run 230 may be in the process of being executed by the controller 108 or may be awaiting execution. For example, the run 230 may be awaiting execution along with one or more additional runs 230 stored in the memory of the controller 108. In one or more embodiments a run 230 can include a number of sub-elements or stages. For example, depicted in FIGS. 2A-2B the run 230 includes a plan 234 and an apply 238.

In one or more embodiments the plan 320 includes a plan file including declarative language describing proposed changes to the configuration 216. In various embodiments, the plan file is created by comparing the infrastructure state to a proposed configuration and proposed variables, and determining which changes are necessary to make the state match the proposed configuration. The plan file thus describes the changes deemed necessary using declarative language which can be applied by the IT infrastructure controller 108. In one or more embodiments, the apply 238 includes carrying out the changes declared by the plan 234 and applying the changed configuration to the infrastructure 104. In various embodiments, this includes provisioning and/or de-provisioning some or all resources accessible by the workspace 210. In some embodiments, the apply stage 328 can be automatically executed subsequent to the plan stage 320. However, in other embodiments, the apply stage 328 can wait for approval or feedback to perform the apply.

In certain embodiments the run 230 could include only the plan 234 and not include the apply 238. In some embodiments, the run 230 could include any number of additional steps. For example, in certain embodiments, the run 230 could include cost review steps, policy check steps, or other steps required in any order desired for execution by the controller 108.

Figure 3:
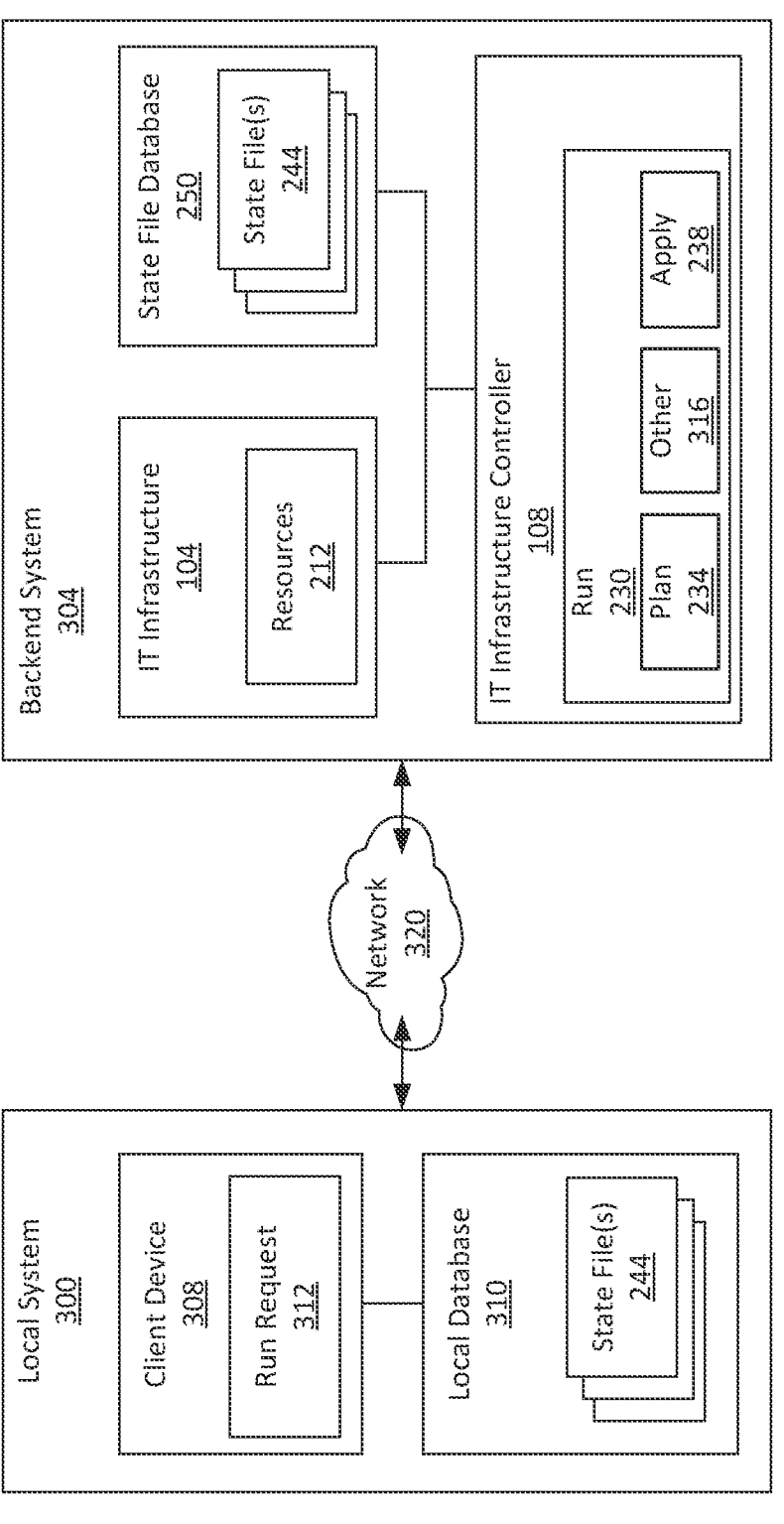
FIG. 3 depicts a network diagram a local system and a backend system, according to one or more embodiments of the disclosure.

Referring to FIG. 3, a network diagram of a local system 300 and a backend system 304 are depicted, according to one or more embodiments of the disclosure. The local system 300 includes a client device 308 and a local database 310. In one or more embodiments, the client device 308 is a computing device having a logic device, such as a processor, CPU, or the like, memory, and can receive and execute computer instructions. In one or more embodiments, the client device 308 can be a physical device that is usable by a consumer or other user. For example, the client device 308 can be a desktop computer, laptop computer, tablet device, smart phone, wearable computing device, or other computing device. In various embodiments the client device 308 can be coupled with one or more other computing elements such as memory, other processing elements, I/O devices, networking adapters, and the like.

The local database 310 is a storage system configured to store data and manage access to stored data. In one or more embodiments the local database 310 can be implemented as a software-based system that is installed on the client device 308 and utilizes the hardware resources of the client device 308 to operate. In some embodiments the local database 310 is implemented on a separate device that is networked with the client device 308 in a local network, over the internet, or the like. For example, in various embodiments the local database 310 could be a cloud-based system accessible to the client device 308 over the internet.

The backend system 304 is substantially similar to the IT provisioning systems described above with reference to FIGS. 1 and 2A-2B. As such, the backend system 304 includes an IT infrastructure 104, which in various embodiments includes resources 212 that have been provisioned by an IT infrastructure controller 108. As described above, in various embodiments, the client device 308 is configured to generate or provide a run request 312 to the backend system 304 that includes providing a configuration file describing a configuration of resources that should be provisioned from the IT infrastructure 104. In response, the infrastructure controller 108 is configured to execute one or more run tasks 230, including a plan 234 and/or apply 238, by executing IaC instructions that are included within the configuration file. Further, in certain embodiments the run task 230 can include one or more other steps 316 which can be included in the run 230, such as for example, cost review steps, policy check steps, or other steps required in any order desired for execution by the controller 108.

In one or more embodiments the run task 230 outputs a state file 244 that services as a reference or as a "source of truth" by indicating a current state of infrastructure 104 including the resources 212 corresponding a workspace. For example, in various embodiments the system stores the IDs and properties of the resources it manages for the workspace in the state file 244, so that it can update or destroy those resources 212 going forward. As such, the state file functions as a reference point for making changes to infrastructure 104 to match the code describing infrastructure in a configuration file.

In various embodiments the local system 300 and backend system 304 are interconnected via a network 320. In one or more embodiments, the network 320 may be, for example, a local area network, a wide area network, a cloud computing environment, a public network (e.g., the internet), or other suitable network for communication between the systems 300, 304. In one or more embodiments, the backend system is configured to provide state files 244 to the local system 300 over the network 320. For example, in one or more embodiments a user of the local system 300 can provide database access keys, ID, or other information that allows the backend system to access the database over the network and to write outputted state files directly to the local database 310. In certain embodiments the state files 244 may additionally by stored by the backend system 304 in the state file database 250.

In such embodiments, the local database 310 provides improved redundancy, system resilience, and can assist users with data compliance issues. For example, in various embodiments the local system 300 may be located within a first jurisdiction, such as the United States or the European Union, which may possess compliance regulations for the storage of particular types of data. For example, the first jurisdiction may require the storage of data within its own jurisdiction or alternatively may forbid storage of data within certain jurisdictions, such as jurisdictions that are hostile to the first jurisdiction or where storage in said jurisdiction may result in security concerns. As such, particular embodiments may be beneficial for compliance with certain security regulations such as SOC 2, or other compliance standards. Further, various embodiments provide improved redundancy by storing state files in database that is under the control of a user such that if the backend system 304 experiences down time, or is otherwise unavailable over the network 320, the owner of the local system 300 will still have access to state files 244. As such, the owner of the local system 300 will be able to determine the current state of the IT infrastructure, the history of changes, and the like, without requiring access to the backend system 304.

Figure 4:
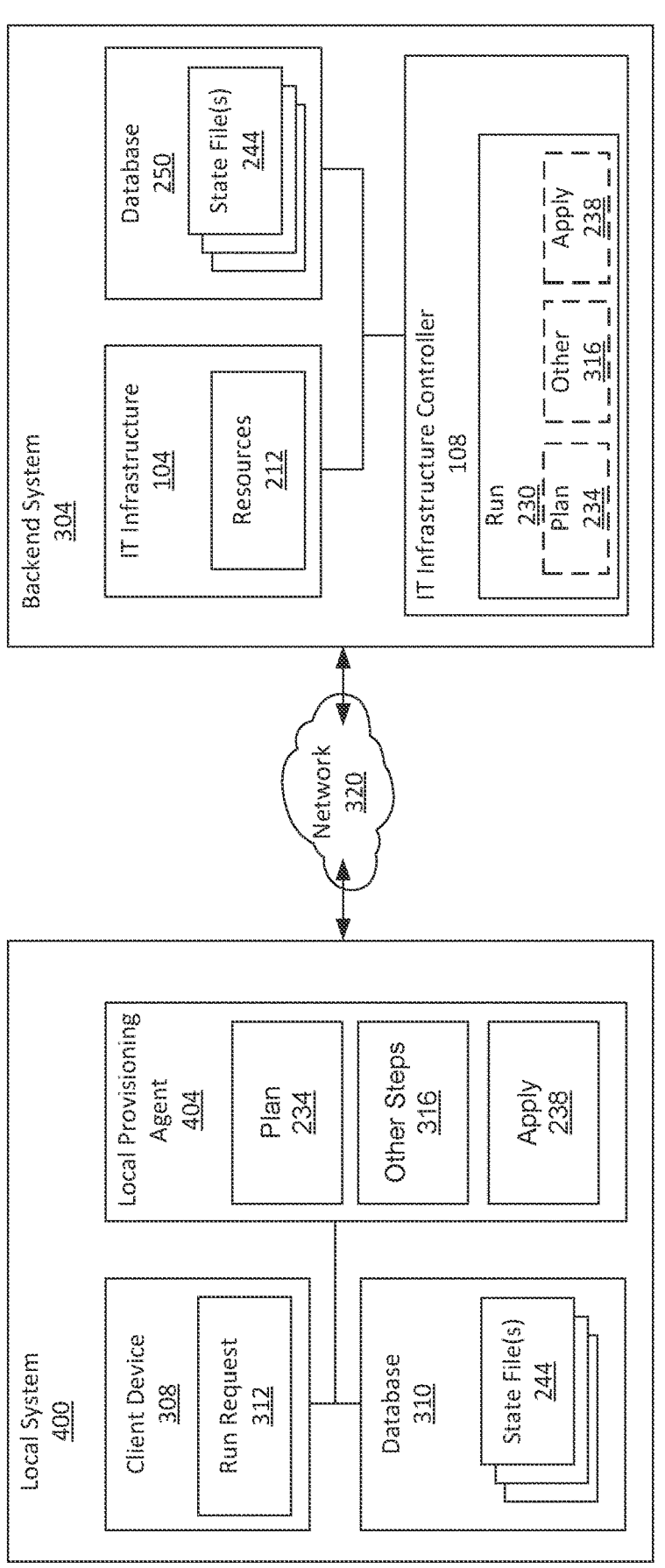
FIG. 4 depicts a network diagram a local system and a backend system, according to one or more embodiments of the disclosure.

Referring to FIG. 4, network diagram of a local system 400 and a backend system 304 is depicted, according to one or more embodiments of the disclosure. The local system 400 includes a client device 308 and a local database 310. Client device 308, local database 310, and the backend system 304 are described above with reference to FIG. 3. Depicted in FIG. 4, the local system 400 further includes a local provisioning agent 404. In one or more embodiments the local provisioning agent 404 is a logical device with memory that is configured to execute IaC instructions in a substantially similar manner as the IT infrastructure controller 108. For example, in various embodiments, the local provisioning agent 404 is configured to execute one or more run tasks, including the plan 234, apply 238, or other steps, by executing IaC instructions that are included within the configuration file. In one or more embodiments local provisioning agent can output a corresponding state file 244 which in various embodiments can be stored locally at database 310 and/or in the backend system 304. In various embodiments, the local provisioning agent 404 may perform only some of the run tasks. For example, in certain embodiments the agent 404 could only perform the plan 234, while sending the remaining tasks to the IT infrastructure controller 108.

In one or more embodiments the local provisioning agent 404 can be implemented as a software-based system that is installed on the client device 308 and utilizes the hardware resources of the client device 308 to operate. In some embodiments the local provisioning agent 404 is implemented on a separate device that is networked with the client device 308 in a local network, over the internet, or the like. For example, in various embodiments the local provisioning agent 404 could be a cloud-based system accessible to the client device 308 over the internet.

Figure 5:
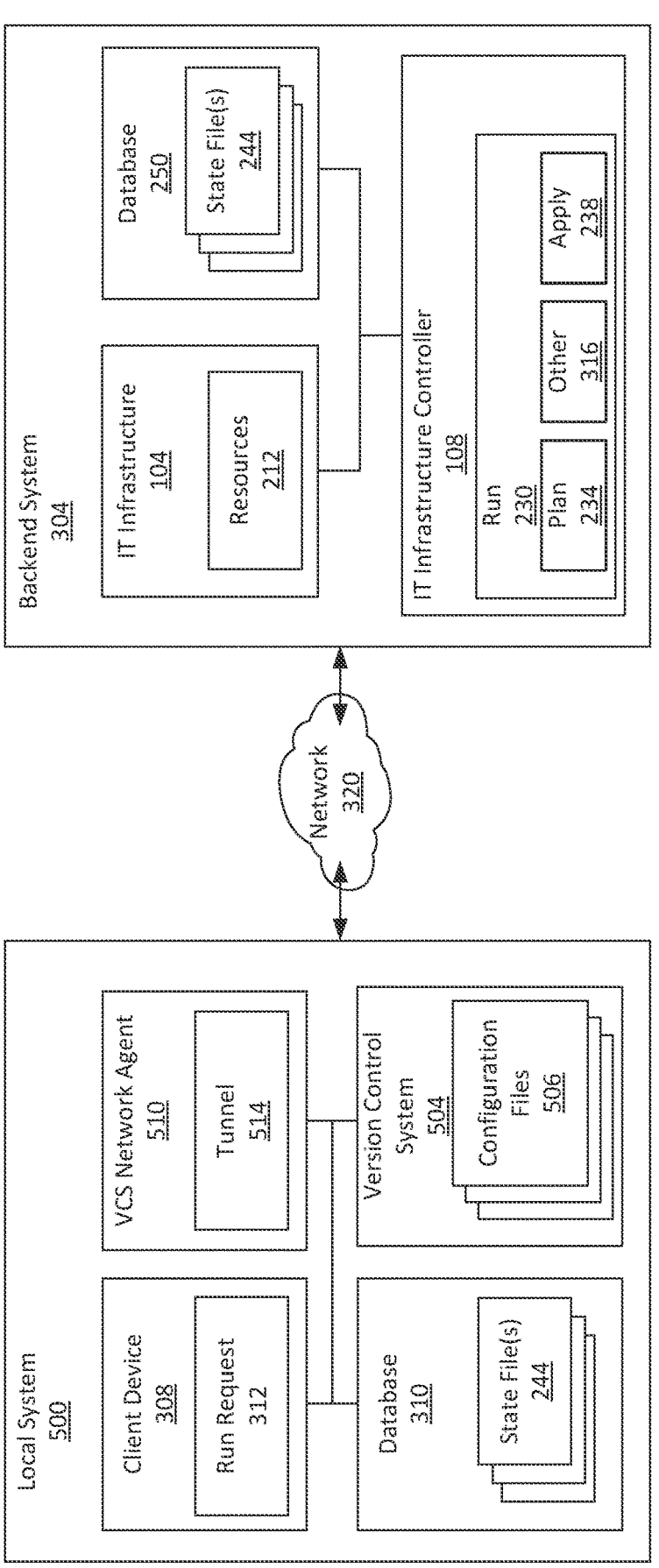
FIG. 5 depicts a network diagram a local system and a backend system, according to one or more embodiments of the disclosure.

Referring to FIG. 5, network diagram of a local system 500 and a backend system 304 is depicted, according to one or more embodiments of the disclosure. The local system 500 includes a client device 308 and a local database 310. Client device 308, local database 310, and the backend system 304 are described above with reference to FIG. 3. Depicted in FIG. 5, the local system 500 further includes a version control system 504. In one or more embodiments the version control system 504 is a system configured to store data and to manage changes to the stored data. As such, in various embodiments, the version control system 504 will generally store data which may be worked on or edited by a team of individuals, the members of which may be geographically dispersed and may pursue different and sometimes contrary interests. In such embodiments the version control system provides a way to easily track changes made and/or to roll back to earlier versions should the need arise. For example, in various embodiments the version control system 504 is configured to store source code, computer programs, documents, or other information. Specifically depicted in FIG. 5, the version control system 504 stores a number of configuration files 506. The version control system 504 tracks and accounts for ownership of changes to the configuration files 506.

In or more embodiments, the configuration files 506 are managed by the system 504 and is used whenever the backend system 304 is required to update resources for execution of an associated resource requirement. For example, the configuration file 506 is first used to provision resources 212 and then is subsequently used to modify the infrastructure to provision or deprovision resources in an associated workspace. As such, in various embodiments changes or updates to the configuration file 506 will produce new or updated runs, including plans and/or applies, that are specific to each version of the configuration file 506. In one or more embodiments, the version-control system 504 retains backups or a database of configuration information. This can be useful for tracking changes over time or recovering from problems. In certain embodiments, the version-control system 504 includes a history database that includes a record of all activity, including one or more of summaries, logs, a reference to the changes, and user comments.

In various embodiments the version control system can operate according to any suitable model of version control, including a centralized model, a distributed model, a local version model, and the like. In one or more embodiments the version control system 504 may be a system utilizing known version control solutions such as GitHub®, GitLab®, Beanstalk®, PerForce®, Apache Subversion®, AWS CodeCommit®, and the like. Further, additional discussion of version control systems can be found in U.S. Pat. Nos. 8,010,497; 9,442,718; and 9,594,605. These patents are incorporated by reference herein.

As described above with regard to the database 310, in one or more embodiments the version control system 504 can be implemented as a software-based system that is installed on the client device and utilizes the hardware resources of the client device 308 to operate. In some embodiments the version control system 504 is implemented on a separate device that is networked with the client device 308. For example, in various embodiments the version control system 504 could be a cloud-based system accessible to the client device 308 over the internet.

In one or more embodiments the local system 500 further includes a version control system agent 510. In various embodiments the version control system agent 510 is a network agent configured to examine and/or manage network packets according to one or more network protocols such as HTTP, HTTPS, FTP, and the like. In one or more embodiments, the version control system agent 510 can be configured to monitor HTTP requests and query a filtering service to determine whether to allow or block a request, and then log the results of the query. Network Agent can also be configured to do the same for non-HTTP requests. In one or more embodiments, the version control system agent 510 monitors and manages the traffic that passes through the network device, such as a switch or hub, to which it is attached.

In certain embodiments, the version control system agent 510 can include multiple network agent instances, for example, depending on the network size, volume of Internet requests, and the network configuration. In one or more embodiments the version control system agent is included in the local system 500 and installed on the internal side of a firewall, or otherwise in a location where it can see all internet requests for the machines it is assigned to monitor. The agent then monitors HTTP and non-HTTP requests from those machines, and the responses that they receive.

In one or more embodiments the version control system agent 510 is configured to implement an HTTP tunnel 514 to establish a connection layer between the local system 500 and the backend system 304. As such, in various embodiments, the tunnel 514 allows for network traffic to be transferred between systems 500, 304 by functioning as an intermediate agent. In one or more embodiments, tunnel 514 operates according to a known fashion. Using an appropriate configuration utility or configuration file for the tunnel 514, a user may specify an input port number to be associated with a destination host address or a destination URI along with a port number of the destination host. The association between the input port number and the destination address/port number is a routing or a mapping between the input and the output at the tunnel 514. Requests that are received by the tunnel 514 on the input port are forwarded using the destination host address and port number such that the tunnel routes HTTP-based messages. In this manner, the tunnel 514 is said to "tunnel" through firewalls that block requests on certain ports since the tunnel 514 can change the destination port number from the originally requested port number in the original request from the client. In various embodiments the tunnel 514 may be configured through monitoring utility, which comprises trace unit that allows incoming and outgoing message traffic to be traced to a log file. Monitoring utility may be configured through configuration files or through an interactive user interface.

In one or more embodiments, the HTTP tunnel 514 could be formatted and controlled in accordance with a variety of well-known protocols through a variety of different network configurations. For example, in various embodiments the tunnel 514 could operate according to any TCP-related protocol. Additional discussion of network tunnels can be found in U.S. Pat. Nos. 6,412,009; 7,117,267; and 7,441,036. These patents are incorporated by reference herein.

Figure 6:
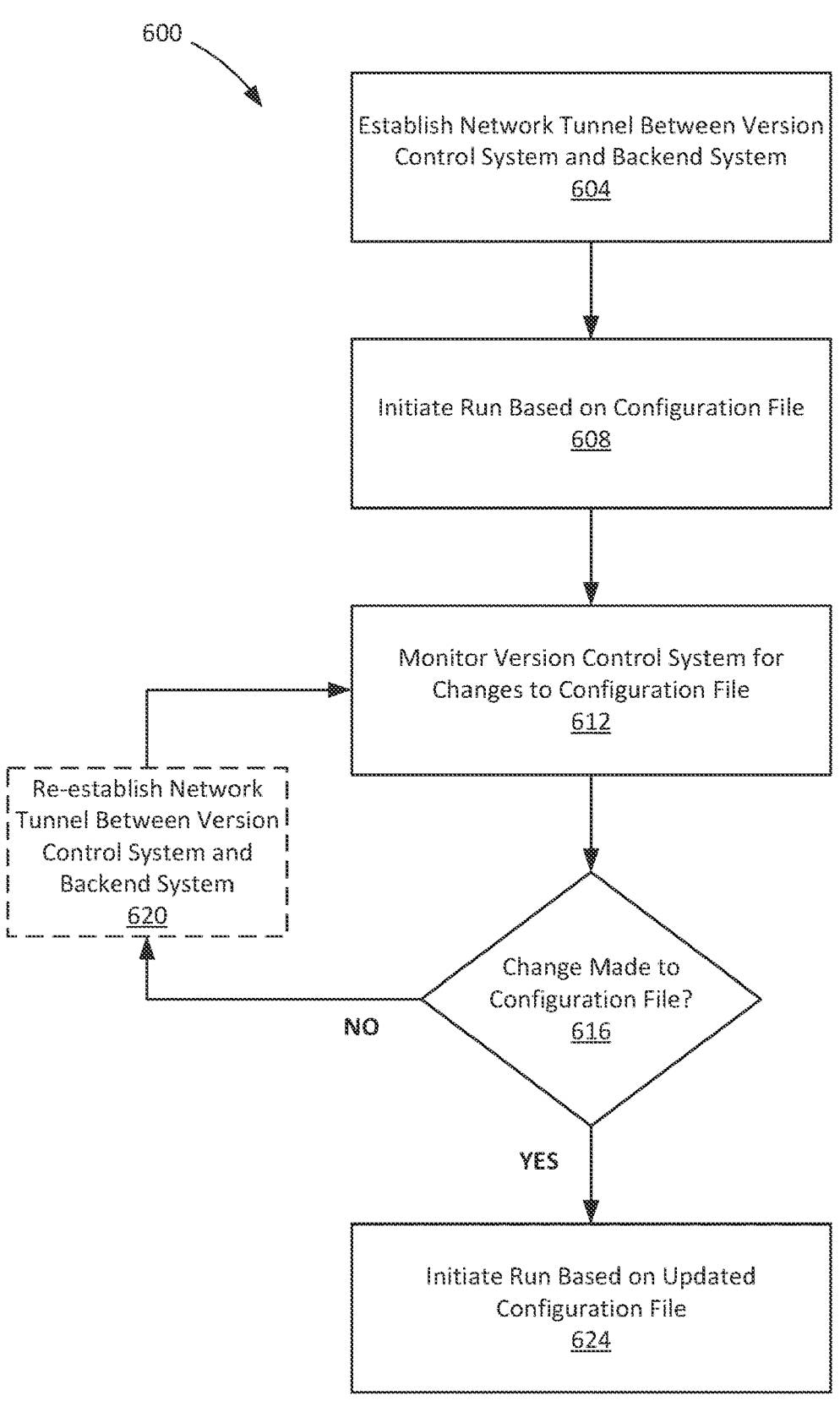
FIG. 6 depicts a method of version-control based updating in an IT infrastructure provisioning system, according to one or more embodiments of the disclosure.

In various embodiments the tunnel 514 connects the backend system 304 and the version control system 504 via the version control system agent 510. In such embodiments, the version control system agent provides a data connection between the version control system 504 and the IT infrastructure controller 108 or other element of the backend system 304 for automated, version control based, updates of provisioned resources 212. For example, referring additionally to FIG. 6, a method 600 of version-control based updating in an IT infrastructure provisioning system is depicted, according to one or more embodiments of the disclosure.

In various embodiments the method 600 includes, at operation 604, establishing a network tunnel between the version control system 504 and the backend system 304. As described, in various embodiments a version-control system agent 510 is configured to implement an HTTP tunnel 514 to establish a connection layer between the local system 500 and the backend system 304. As such, in various embodiments, the tunnel 514 allows for network traffic to be transferred between systems 500, 304 by functioning as an intermediate agent. In one or more embodiments, the method 600 includes, at operation 608, initiating a run based on a configuration file managed by the version control system 504. In such embodiments, the client device 308 can request a run and a run task 230 is created at the IT infrastructure controller 108. Depicted in FIG. 5, the run task 230 includes one or more steps/elements for execution by the controller 108 including a plan 234, apply 238, and one or more other steps 316. In one or more embodiments, the IT infrastructure controller 108 will access the configuration file 506 for initiating the run from the version-control system 504 via the tunnel 514. In such embodiments the tunnel 514 allows the configuration files 506 to be continuously managed by the version-control system 504 while also allowing the backend system 304 to access the configuration files 506 for provisioning resources.

In one or more embodiments, the method 600 includes, at operation 612, monitoring the version control system for changes to the configuration file. At decision point 616, if a change is made to the configuration file the method 600 proceeds to operation 624 where a new run is initiated based on the updated configuration file. If no change has been made to the configuration file, the method 600 proceeds back to operation 612 and optionally via operation 620. As described above, the version control system 504 tracks and accounts for changes to the stored configuration files 506. In one or more embodiments, monitoring can be continuous or periodic. For example, in certain embodiments the local system 500 and backend system 304 will continuously maintain the tunnel 514 connection and continuously monitor the status of the configuration file 506 managed by the version control system 504. In certain embodiments the local system 500 and backend system 304 will periodically monitor the status of the configuration file 506. For example, in certain embodiments, if no changes have been made to the configuration file within a threshold time the system will close the tunnel 514. Subsequently after another threshold time period the system will re-establish the tunnel 514 and resume monitoring. In such embodiments, this process can repeat until change to the configuration file is detected.

Figure 7:
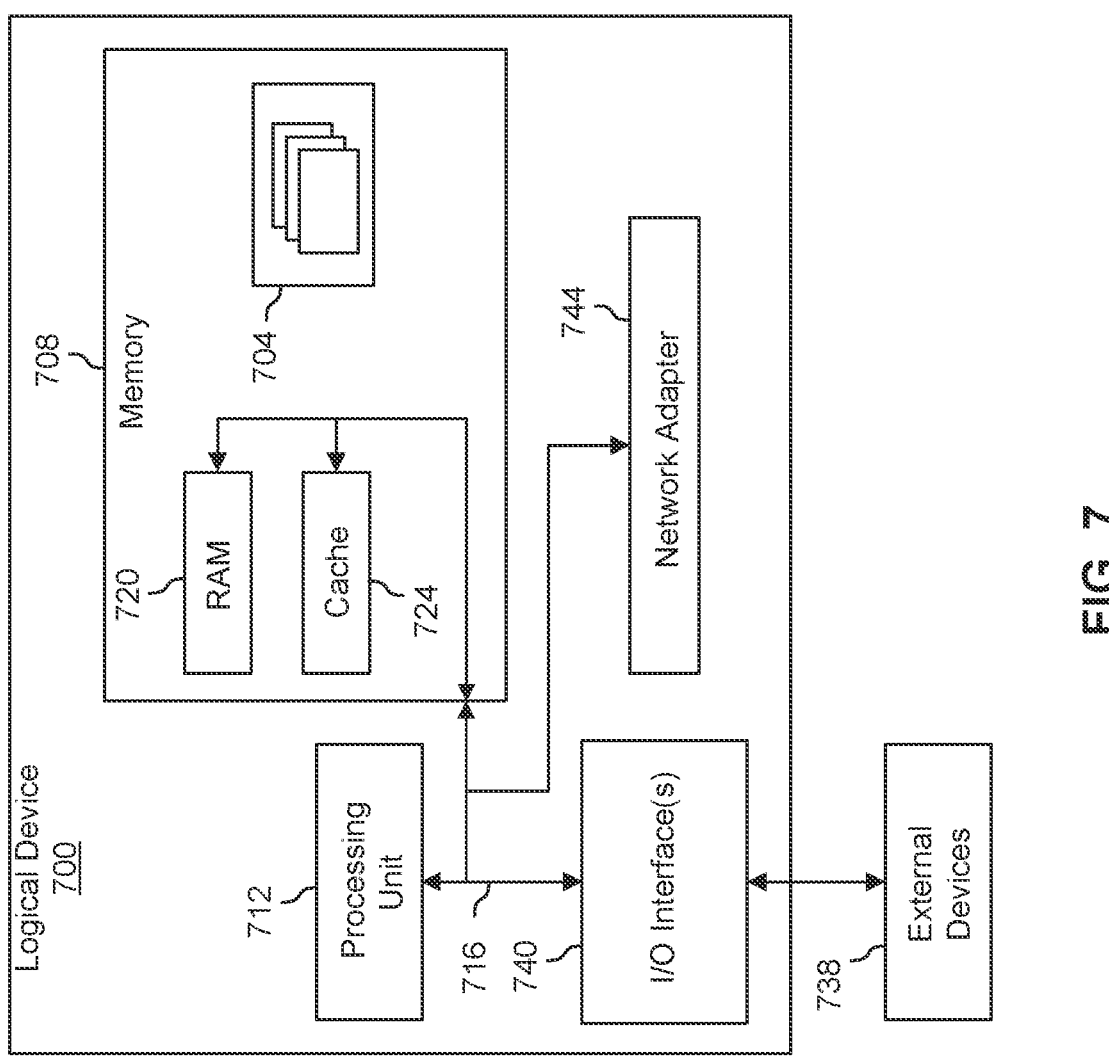
FIG. 7 depicts a logical device including a processor and a computer readable storage unit are depicted, according to one or more embodiments of the disclosure.

Referring to FIG. 7, a logical device 700 including a processor and a computer readable storage unit are depicted, according to one or more embodiments of the disclosure. In various embodiments, logical 700 is for use in IT management system for executing various embodiments of the disclosure as described above. For example, and as described herein, logical device 700 can be configured to execute and/or store various program instructions as a part of a computer program product. Logical device 700 may be operational with general purpose or special purpose computing system environments or configurations, such as the systems described according to the embodiments herein.

Examples of computing systems, environments, and/or configurations that may be suitable for use with logical device 700 include, but are not limited to, personal computer systems, server computer systems, handheld or laptop devices, multiprocessor systems, mainframe computer systems, distributed computing environments, and the like.

Logical device 700 may be described in the general context of a computer system, including executable instructions, such as program modules 704, stored in system memory 708 being executed by a processor 712. Program modules 704 may include routines, programs, objects, instructions, logic, data structures, and so on, that perform particular tasks or implement particular abstract data types. Program modules 704 may be practiced in distributed computing environments where tasks are performed by remote processing devices that are linked through a network. In a distributed computing environment, program modules 704 may be located in both local and remote computer system storage media including memory storage devices. As such, in various embodiments logical device 700 can be configured to execute various program modules 704 or instructions for executing various embodiments of the disclosure. For example, in various embodiments logical device 700 can be configured to execute a run or a policy run to generate proposed changes to a configuration or to modify polices in a policy group associated with a workspace.

The components of the logical device 700 may include, but are not limited to, one or more processors 712, memory 708, and a bus 716 that couples various system components, such as, for example, the memory 708 to the processor 712. Bus 716 represents one or more of any of several types of bus structures, including, but not limited to, a memory bus and/or memory controller, a peripheral bus, and a local bus using a suitable of bus architecture.

In one or more embodiments, logical device 700 includes a variety of computer readable media. In one or more embodiments, computer readable media includes both volatile and non-volatile media, removable media, and non-removable media.

Memory 708 may include computer readable media in the form of volatile memory, such as random-access memory (RAM) 720 and/or cache memory 724. Logical device 700 may further include other volatile/non-volatile computer storage media such as hard disk drive, flash memory, optical drives, or other suitable volatile/non-volatile computer storage media. As described herein, memory 708 may include at least one program product having a set (e.g., at least one) of program modules 704 or instructions that are configured to carry out the functions of embodiments of the disclosure.

Logical device 700 may also communicate with one or more external devices 738 such as other computing nodes, a display, keyboard, or other I/O devices, via an I/O interface (s) 740 for transmitting and receiving sensor data, instructions, or other information to and from the logical device 700. In one or more embodiments, I/O interface 740 includes a transceiver or network adaptor 744 for wireless communication. As such, in one or more embodiments, I/O interface 740 can communicate or form networks via wireless communication.

One or more embodiments may be a computer program product. The computer program product may include a computer readable storage medium (or media) including computer readable program instructions for causing a processor to enhance target intercept according to one or more embodiments described herein. The computer readable storage medium is a tangible device that can retain and store instructions for use by an instruction execution device. The computer readable storage medium may be, for example, an electronic storage device, a magnetic storage device, an optical storage device, or other suitable storage media.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Program instructions, as described herein, can be downloaded to respective computing/processing devices from a computer readable storage medium or to an external computer or external storage device via a network, for example, the Internet, a local area network, a wide area network and/or a wireless network. A network adapter card or network interface in each computing/processing device may receive computer readable program instructions from the network and forward the computer readable program instructions for storage in a computer readable storage medium within the respective computing/processing device.

Computer readable program instructions for carrying out one or more embodiments, as described herein, may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a single computer, or partly on the single computer and partly on a remote computer. In some embodiments, the computer readable program instructions may execute entirely on the remote computer. In the latter scenario, the remote computer may be connected to the single computer through any type of network, including a local area network (LAN) or a wide area network (WAN), or public network.

One or more embodiments are described herein with reference to flowchart illustrations and/or block diagrams of methods, systems, and computer program products according to one or more of the embodiments described herein. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the method steps discussed above, or flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The method steps, flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some embodiments, the functions noted in the block may occur out of the order noted in the figures. For example, two blocks shown in succession may in fact, be executed substantially concurrently, or the blocks may sometimes be executed in the reverse order, depending upon the functionality involved.

In one or more embodiments, the program instructions of the computer program product are configured as an "App" or application executable on a laptop or handheld computer utilizing a general-purpose operating system. As such, in various embodiments can be implemented on a handheld device such as a tablet, smart phone, or other device.

In various embodiments, the code/algorithms for implementing one or more embodiments are elements of a computer program product, as described above, as program instructions embodied in a computer readable storage medium. As such, such code/algorithms can be referred to a program instruction means for implementing various embodiments described herein.

In addition, to the above disclosure, U.S. Pat. No. 11,223,526 is hereby incorporated by reference.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A version-control provisioning system comprising:
a backend IT infrastructure system comprising:
an IT infrastructure comprising cloud resources including one or more of hardware resources, software resources, and network resources; and
an IT infrastructure controller networked with the IT infrastructure, the controller comprising a processor and computer readable non-transitory memory including computer executable instructions;
a local system, comprising:
a client device;
a local version-control system configured to manage a configuration file including infrastructure as code instructions; and
a local agent including a processor and computer readable non-transitory memory including computer executable instructions;
wherein the local agent includes computer-readable instructions that, when executed, cause the local agent to establish a network tunnel connecting the local version-control system via the local agent;
wherein the IT infrastructure controller includes computer-readable instructions that, when executed, cause the controller to:
receive a request to execute a run, the run at least including a planning step where proposed changes to a configuration of API-manageable resources are determined based on the configuration file infrastructure as code instructions managed by the version-control system.

2. The system of claim 1, wherein the run further includes an apply step where the proposed configuration of the cloud resources is executed; and
wherein the IT infrastructure controller includes computer readable instructions that, when executed, cause the controller to:
send the apply step to the local agent for execution.

3. The system of claim 1, wherein the run further includes one or more of a cost review step and a policy check step; and
wherein the IT infrastructure controller includes computer readable instructions that, when executed, cause the controller to:
send one or more of a cost review step and a policy check step to the local agent for execution.

4. The system of claim 1, wherein the local system further includes a local database, and wherein the IT infrastructure controller includes computer readable instructions that, when executed, cause the controller to:

store a state file resulting from the run in the local database, the state files sent from the backend IT infrastructure system to the local database via the network connection.

5. The system of claim 4, wherein the local system is located in a first jurisdiction and the backend IT infrastructure system is located in a second jurisdiction.

6. The system of claim 5, wherein the backend IT infrastructure system does not store a state file in the second jurisdiction.

* * * * *